United States Patent
Reddy et al.

(10) Patent No.: US 10,909,599 B2
(45) Date of Patent: Feb. 2, 2021

(54) SYSTEMS AND METHODS FOR CAR SHOPPING USING MESSAGING FRAMEWORK

(71) Applicant: Capital One Services, LLC, McLean, VA (US)

(72) Inventors: Sean Reddy, New York, NY (US); Sunil Subrahmanyam Vasisht, Flowermound, TX (US); Micah Price, Plano, TX (US); Arjun Dugal, Dallas, TX (US); Geoffrey Dagley, McKinney, TX (US); Raman Bajaj, Frisco, TX (US); Stephen Michael Wylie, Carrollton, TX (US); Jason Richard Hoover, Grapevine, TX (US); Qiaochu Tang, The Colony, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/915,863

(22) Filed: Mar. 8, 2018

(65) Prior Publication Data

US 2019/0279270 A1 Sep. 12, 2019

(51) Int. Cl.
| | |
|---|---|
| G06Q 30/06 | (2012.01) |
| H04L 12/58 | (2006.01) |
| G06K 9/00 | (2006.01) |
| G06K 9/62 | (2006.01) |
| G06F 7/02 | (2006.01) |
| H04L 29/08 | (2006.01) |

(52) U.S. Cl.
CPC .......... *G06Q 30/0623* (2013.01); *G06F 7/02* (2013.01); *G06K 9/00671* (2013.01); *G06K 9/6202* (2013.01); *G06K 9/6215* (2013.01); *H04L 51/046* (2013.01); *H04L 67/02* (2013.01)

(58) Field of Classification Search
CPC .................................................. G06Q 30/0623
See application file for complete search history.

(56) References Cited

U.S. PATENT DOCUMENTS

| | | |
|---|---|---|
| 7,565,139 B2 | 7/2009 | Neven, Sr. et al. |
| 7,751,805 B2 | 7/2010 | Neven et al. |
| | (Continued) | |

OTHER PUBLICATIONS

Muhammad Asif Manzoor, "Vehicle Make and Model Recognition using Random Forest Classification for Intelligent Transportation Systems," Feb. 22, 2018, Institute of Electrical and Electronics Engineers, 2018 IEEE 8th Annual Computing and Communication Workshop and Conference, p. 148-154 (Year: 2018).*

*Primary Examiner* — Brittney N Miller
*Assistant Examiner* — Anna Mae Mitros
(74) *Attorney, Agent, or Firm* — Finnegan, Henderson, Farabow, Garrett & Dunner LLP

(57) ABSTRACT

Disclosed embodiments provide devices, methods, and computer-readable storage media for determining information of an object from a captured image. Further, the disclosed device responds to a user input by capturing, with the camera, image data representing an object. The device then transmits, via a messaging application through a network interface to a server, the image data and a request for information relating to the object. The object information is received via the messaging application through the network from the server and is displayed on the display screen.

20 Claims, 7 Drawing Sheets

(56) References Cited

U.S. PATENT DOCUMENTS

| | | | |
|---|---|---|---|
| 9,037,599 B1* | 5/2015 | Bailly | G06T 3/40 |
| | | | 707/769 |
| 2012/0230548 A1 | 9/2012 | Calman et al. | |
| 2014/0147053 A1* | 5/2014 | Boncyk | G06F 17/30259 |
| | | | 382/218 |
| 2015/0235296 A1* | 8/2015 | Hamilton | G06Q 30/0627 |
| | | | 705/26.63 |
| 2016/0092959 A1* | 3/2016 | Gross | G06K 9/00671 |
| | | | 705/26.62 |
| 2016/0148292 A1* | 5/2016 | Gupta | G06Q 30/0623 |
| | | | 705/26.61 |
| 2017/0193337 A1* | 7/2017 | Kriegman | G06K 9/6277 |
| 2018/0129914 A1* | 5/2018 | Kariya | G06K 9/00624 |
| 2018/0152641 A1* | 5/2018 | Loosli | H04N 5/265 |
| 2018/0197223 A1* | 7/2018 | Grossman | G06K 9/4619 |
| 2018/0330198 A1* | 11/2018 | Harary | G06K 9/6276 |

* cited by examiner

SYSTEMS AND METHODS FOR CAR SHOPPING USING MESSAGING FRAMEWORK

TECHNICAL FIELD

The present disclosure generally relates to accessing object information using mobile devices. More specifically, this disclosure relates to devices and methods for identifying objects from captured images and videos communicated through inbuilt communication services and for determining the information about the identified object.

BACKGROUND

Shopping for a certain kind of object requires knowing the identity of the object and location to purchase the identified object. Such identification, while currently possible through various search engines, often requires installation of a specialized application, in addition to the search engine itself, to purchase the identified object. Moreover, while generic search engines are good at providing information about an object, they lack inbuilt shopping functionality, that is, the ability to engage in e-commerce without installation of additional software. Although some online shopping services provide search capability, such capability is limited to their own inventory. Also, the amount of information relevant to the object that is made available to the user is often limited. In view of these and other shortcomings and problems with existing technology, improved systems and methods for identifying objects and accessing their information is desired.

SUMMARY

Disclosed embodiments provide devices and methods for determining object information from a captured image.

Consistent with embodiments, a mobile device for determining object information is provided. The device may include at least one memory device storing operating system with a built-in messaging application. The device may include a camera. The device may also include a network interface. The device may also include a display screen. The device also includes at least one processor executing instructions to perform operations.

The operations may include responding to a user input by capturing, with the camera, image data representing an object. The operations may also include transmitting, via the messaging application through the network interface to a server, the image data and a request for information relating to the object. Requesting information relating to the object from the server may include generating temporary images based on the captured image; comparing the temporary images to a plurality of reference images; assigning scores to the reference images, based on similarity to the test images; aggregating scores assigned to the references images by the test images; identifying a reference image with a highest aggregated score as the identity of the object; and determining information related to the object based on the identity of the object. The operations may further include receiving the object information via the messaging application through the network interface from the server. The operations may also include displaying the object information on the display screen.

Consistent with embodiments, non-transitory computer-readable storage media may store instructions that are executable by at least one processor of mobile device to perform methods disclosed herein. A method may include responding to a user input by capturing, with the camera, image data representing an object. The method may also include transmitting, via the messaging application through the network interface to a server, the image data and a request for information relating to the object. Requesting information relating to the object from the server may include generating temporary images based on the captured image; comparing the temporary images to a plurality of reference images; assigning scores to the reference images, based on similarity to the test images; aggregating scores assigned to the references images by the test images; identifying a reference image with a highest aggregated score as the identity of the object; and determining information related to the object based on the identity of the object. The method may further include receiving the object information via the messaging application through the network interface from the server. The method may also include displaying the object information on the display screen.

Consistent with the embodiments, methods for determining object information are provided. A method may include responding to a user input by capturing, with the camera, image data representing an object. The method may also include transmitting, via the messaging application through the network interface to a server, the image data and a request for information relating to the object. Requesting information relating to the object from the server may include generating temporary images based on the captured image; comparing the temporary images to a plurality of reference images; assigning scores to the reference images, based on similarity to the test images; aggregating scores assigned to the references images by the test images; identifying a reference image with a highest aggregated score as the identity of the object; and determining information related to the object based on the identity of the object. The method may further include receiving the object information via the messaging application through the network interface from the server. The method may also include displaying the object information on the display screen.

BRIEF DESCRIPTION OF THE DRAWINGS

The accompanying drawings, which are incorporated in and constitute a part of this specification, illustrate several examples, and, together with the description, serve to explain the disclosed principles, In the drawings.

DETAILED DESCRIPTION

Reference will now be made in detail to exemplary embodiments, examples of which are illustrated in the accompanying drawings and disclosed herein. Wherever convenient, the same reference numbers will be used throughout the drawings to refer to the same or like parts. For ease of discussion, the present disclosure may describe embodiments in the context of online shopping, such as shopping for a car. It is to be understood, however, that disclosed embodiments are not limited to online shopping applications. Rather, the disclosed devices and methods are applicable to object identification and determination of information from a captured image or video for many other purposes and, in fact, are not limited to any particular industry or field.

Figure 1:
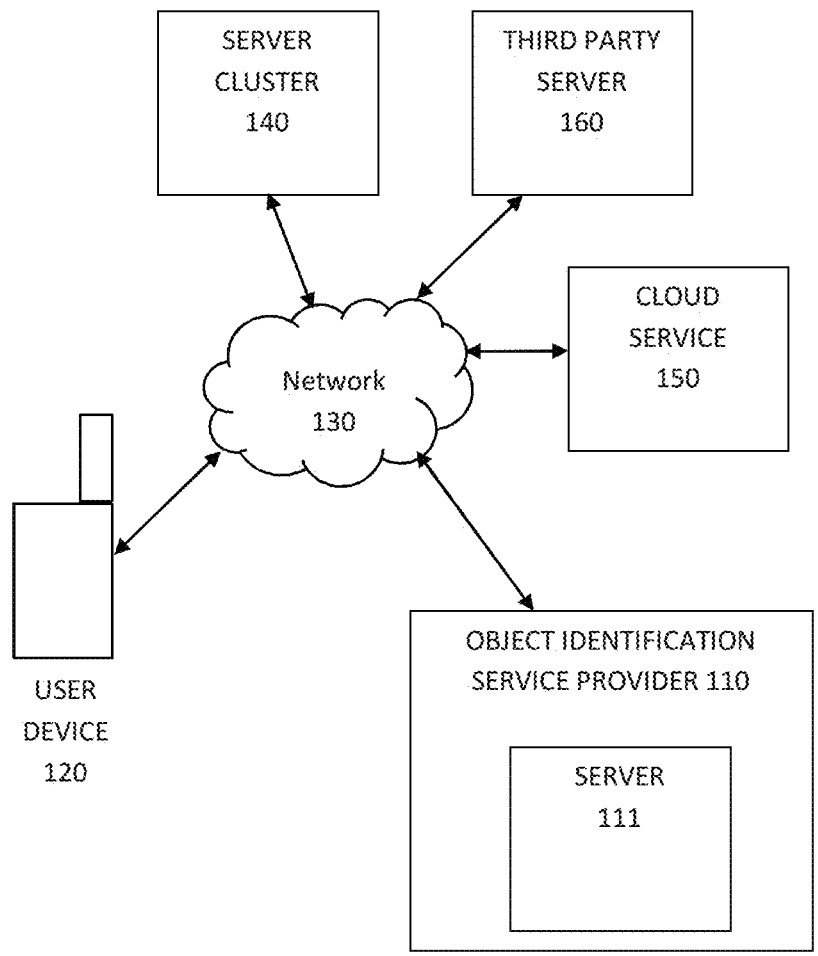
FIG. 1 is a schematic diagram illustrating an exemplary system environment used to determine information about objects, consistent with disclosed embodiments.

FIG. 1 is a schematic diagram of an exemplary system environment that may be configured to provide information about an object in an image, consistent with disclosed examples. The components and arrangements shown in FIG. 1 are not intended to limit the disclosed examples, as the components used to implement the disclosed processes and features may vary.

In accordance with the disclosed embodiments, an object identification system 100 may include an object identification service provider 110, a user device 120, a network 130, a server cluster 140, a cloud service 150, and a third-party server. Object identification service provider 110 operates at least one server 111. Server 111 may be a computer-based system including computer system components, desktop computers, workstations, tables, handheld computing devices, memory devices, and/or internal network(s) connecting the components. Server 111 is discussed in additional detail with respect to FIG. 3, below.

User device 120 may be a tablet, smart phone, multifunctional watch, or any suitable device with computing and text message service capability which enable user device 120 to communicate with server 111 through a network 130. User device 120 is discussed in additional detail with respect to FIG. 2 below.

Components of system 100 may communicate via network 130 which, in some embodiments, may comprise one or more interconnected wired or wireless data networks that exchange data between devices such as user device 120, server 111 of object identification service provider 110, server cluster 140, and/or cloud service 150. Network 130 may be may be a secured or unsecured network and may be implemented as, for example, the internet, a wired Wide Area Network (WA), a wired Local Area Network (LAN), a wireless LAN (e.g., IEEE 802.11, Bluetooth, etc.), a wireless WAN (e.g., WiMAX), or the like. Each component in system 100 may communicate bi-directionally with other components of system 100 either through network 130 or through one or more direct communication links (not shown).

Third-party server 160 is associated with a third party and may communicate with object identification service provider 110. The third party may be, for example, a car dealership, a car manufacturer, a company or other suitable data source managing data related to cars. Third-party server 160 may provide information to object identification service provider 110. For example, in some embodiments, third-party server 160 may provide images and videos of a car identified by object identification service provider 110. In some embodiments, third-party server 160 may provide location data specifying a car dealership where an identified model and make car is available.

Cloud service 150 may include a physical and/or virtual storage system associated with cloud storage for storing data and providing access to data via a public network such as the Internet. Cloud service 150 may include cloud services such as those offered by, for example, Amazon, Cisco, IBM, Google, Microsoft, Rackspace, or other entities.

In some embodiments, cloud service 150 comprises multiple computer systems spanning multiple locations and having multiple databases or multiple geographic locations associated with a single or multiple cloud storage service(s). As used herein, cloud service 150 refers to a physical and virtual infrastructure associated with a single cloud storage service. In some embodiments, cloud service 150 manages and/or stores data associated with mass execution of analytical models using scale-out computing to predict optimal decisions.

Other components known to one of ordinary skill in the art may be included in object identification system 100 to process, transmit, provide and receive information consistent with the disclosed examples. In addition, although not shown in FIG. 1, components of system 100 may communicate each other through direct communications, rather than through network 130.

Figure 2:
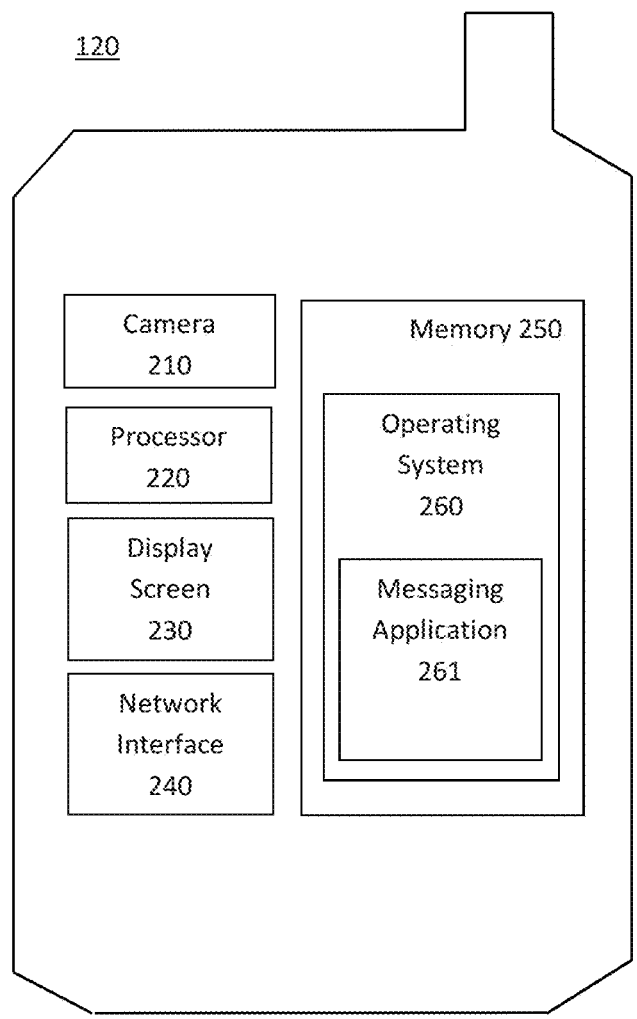
FIG. 2 is a component diagram of an exemplary user device, consistent with the present disclosure.

FIG. 2 is a diagram of an exemplary user device 120, configured to perform functions of the disclosed methods, consistent with the present disclosure. User device 120 may be a mobile device with computing capabilities, such as a tablet, a smartphone, or any combination of these devices and/or affiliated components. As shown, user device 120 may include a camera 210, one or more processors 220, a display screen 230, a network interface 240, and one or more memory devices 250 storing one or more operating systems 260, including an inbuilt messaging application 261. Camera 210 is used to generate a user-provided image of an object to be identified, which is transmitted by messaging application 261 for identification, as described below.

Display screen 230 may include, for example, a liquid crystal display (LCD), a light emitting diode screen (LED), an organic light emitting diode screens (OLED), a touch screen, or other known display screens. Display screen 230 may display various kinds of information, to be described below.

Network interface 240 allows user device 120 to send and receive information through network 130. Alternatively, or in addition, network interface 240 may establish direct wired or wireless connection between user device 120 and other system components, such as server 111 (FIG. 1).

Memory 250 may be, for example, a magnetic, semiconductor, tape, optical, removable, non-removable, or other type of storage device or tangible (i.e., non-transitory) computer-readable medium. Memory 250 may store operating system 260, as well as data and mobile applications for performing operations consistent with functions described below.

Operating system 260 may perform known operating system functions when executed by processor 220. By way of example, the operating system may include Android™, Apple OS X™, Unix™, Linux™, or others. Accordingly, examples of the disclosed invention may operate and function with computer systems running any type of operating system having an inbuilt messaging application. Messaging application 261, when executed by processor 250, provides text messaging communication via network 130 (FIG. 1).

Figure 3:
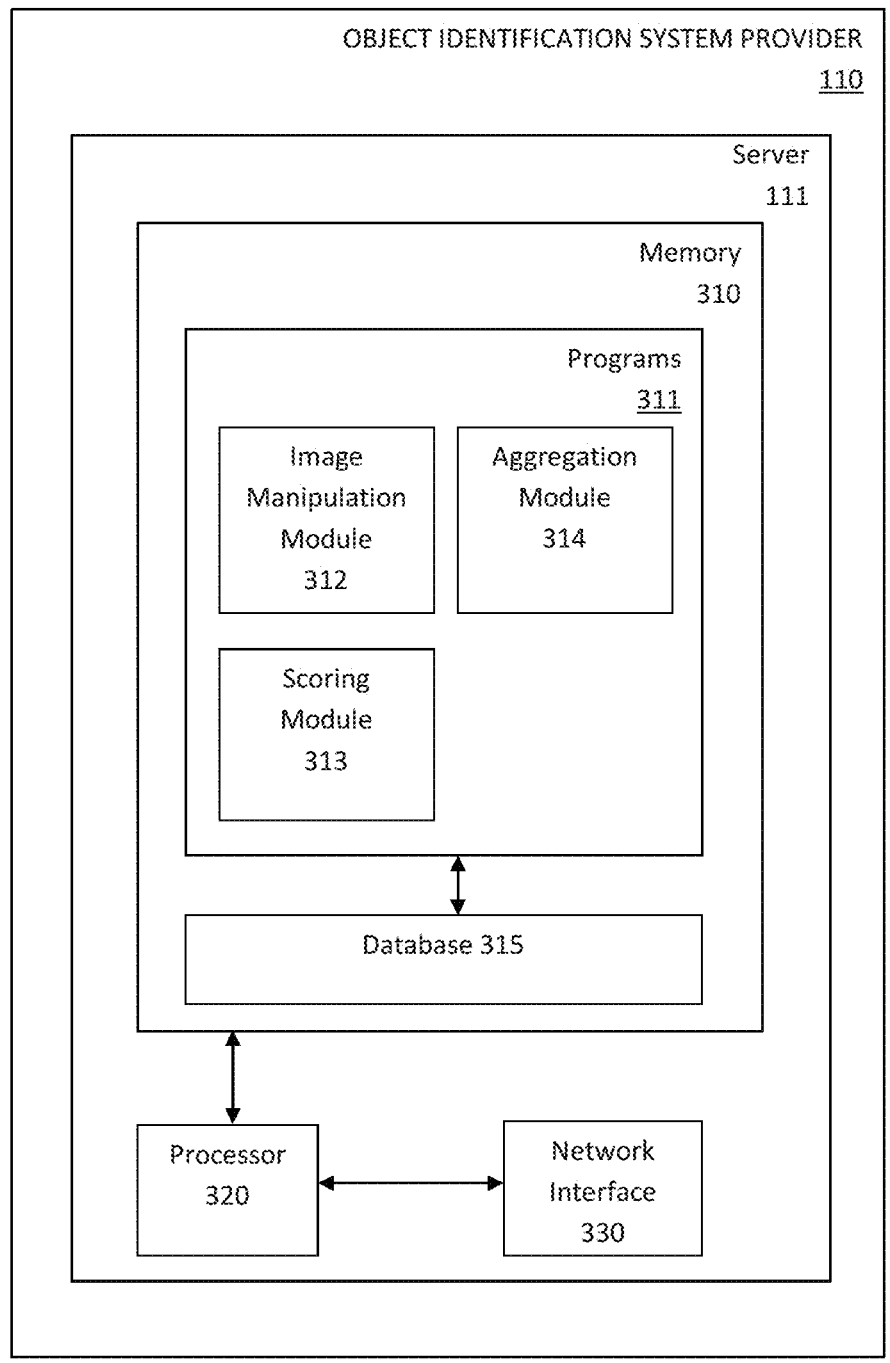
FIG. 3 is a component diagram of an exemplary object identification service provider consistent with the present disclosure.

FIG. 3 is a diagram of an exemplary object identification service provider 110, configured to perform functions of the disclosed methods, consistent with the present disclosure. As shown in FIG. 3, object identification service provider 110 may include at least one server 111, one or more memory devices 310, one or more programs 311, an image manipulation module 312, an aggregation module 314, a scoring module 313, one or more processors 320, and a network interface 330.

Server 111 may be a single server or may be configured as a distributed computer system including multiple servers or computers server clusters 150 and/or cloud service 160) that interoperate to perform one or more of the processes and functionalities associated with the disclosed embodiments.

Processor 320 may be one or more known or custom processing devices designed to perform functions of the disclosed methods, such as a single core or multiple core processors capable of executing parallel processes simultaneously. For example, processor 320 may be configured with virtual processing technologies. In certain embodiments, processor 320 may use logical processors to simultaneously execute and control multiple processors. Processor 320 may be implement virtual machine, or other known technologies to provide the ability to execute, control, nm, manipulate, store, etc. multiple software processes, applications, programs, etc. In another embodiment, processor 320 may include multiple-core processor arrangement (e.g., dual core, quad core, etc.) configured to provide parallel processing functionalities to allow object identification service provider 110 to execute multiple processes simultaneously. One of ordinary skill in the art would understand that other types of processor arrangements could be implemented that provide for the capabilities disclosed herein.

Network interface 330 may be implemented as one or more devices for receiving signals or input from devices and providing signals or output to one or more devices that allow data to be received and/or transmitted by object identification service provider 110.

Memory 310 may include one or more memory devices that store data and instructions used to perform one or more features of the disclosed embodiments. For example, memory 310 may represent a tangible and non-transitory computer-readable medium having stored therein computer programs, sets of instructions, code, or data to be executed by processor 320. Memory 310 may include, for example, a removable memory chip (e.g., EPROM, RAM, ROM, DRAM, EE PROM, flash memory devices, or other volatile or non-volatile memory devices) or other removable storage units that allow instructions and data to be accessed by processor 320.

Memory 310 may also include instructions that, when executed by processor 320, perform operations consistent with the functionalities disclosed herein. Methods, systems, and devices consistent with disclosed embodiments are not limited to separate programs or computers configured to perform dedicated tasks. For example, memory 310 may include one or more programs 311 to perform one or more functions of the disclosed embodiments. Moreover, processor 320 may execute one or more programs located remotely from system 100. For example, object identification service provider 110 may access one or more remote programs, that, when executed, perform functions related to disclosed embodiments.

Memory 310 may also include any combination of one or more relational and/or non-relational databases 315 such as document management systems, Microsoft SQL databases, SharePoint databases, Oracle databases other relational databases, or non-relational databases such as Apache HBase. In some embodiments, memory 310 may comprise an associative array architecture, such as a key-value storage, for storing and rapidly retrieving large amounts of information.

Object identification service provider 110 may also be communicatively connected to one or more remote memory devices (e.g., remote databases (not shown)) through network 130 or a different network. The remote memory devices may be configured to store information (e.g., structured, semi-structured, and/or unstructured data) and may be accessed and/or managed by object identification service provider 110. By way of example, the remote memory devices may be document management systems, Microsoft SQL databases, SharePoint databases, Oracle databases, or other relational databases. Systems and methods consistent with disclosed embodiments however are not limited to separate databases or even to the use of a database.

Programs 311 stored in memory 310 and executed by processor(s) 320 may include one or more image manipulation module(s) 312, scoring module(s) 313, and object identification module(s) 314. Programs 311 may be stored in an internal memory or external storage (not shown) in direct communication with object identification service provider 110, such as one or more database or memory accessible over network 130. The internal database and external storage may be a volatile or non-volatile, or other type of storage device or non-transitory computer-readable medium.

Image manipulation module 312 pre-processes and modifies the image to generate multiple images using various features to assist the operation of scoring module 313. Modification features include cropping an image, flipping an image along x-axis and y-axis, skewing an image horizontally and vertically, and changing color characteristics of the image by manipulating the histogram.

Consistent with disclosed embodiments, object identification system provider 110 may execute one or more scoring modules, including but not limited to scoring module 313. The purpose of scoring module 313 is to compare the temporary images, that are, internally generated by image manipulation module 312 (from the user-provided image) to external images of known objects obtained from a database containing reference images, and to assign scores to the comparison results based on similarity. The scoring model used in scoring module 313 may be an analytical model applying, for example, linear regression algorithms, boosted tree algorithms, and/or convolution neural networks. Scoring module 313 may leverage structured data (e.g., text data received from user device 120, data received from dealer website via an API, etc.) or unstructured data (e.g., images or videos of an object to be identified) to produce scores indicating the matching level associated. In one example, when an image of a car is transmitted by user device 120, externally obtained images of various car models and makes are assigned scores by scoring module 313. The scores may be based on the similarities of the externally obtained images of known car models and makes to the car in the user-provided image. The scores may indicate the confidence level the object identification service provider 110 has in uniquely identifying the car. The multiple images obtained using image manipulation module 312 may result in multiple scores associated with each model and make.

Aggregate module 314 aggregates the scored entries to uniquely identify the representation of an object in image data. Aggregation may involve adding scores of a certain identity of object in various images. The entry with the highest score is regarded the identity of the object.

Database 315 in memory 310 may be used as a temporary or permanent storage. Images received over network 130 to determine object information may be stored in the database. Database 315 might temporarily store images generated by image manipulation module 312. Database 315 may also store reference images accessed by scoring module 313 to assign scores to images generated by image manipulation module 312.

Descriptions of the disclosed embodiments are not exhaustive and are not limited to the precise forms or embodiments disclosed. Modifications and adaptions of the embodiments will be apparent from consideration of the specification and practice of the disclosed embodiments. For example, the described implementations include hardware, firmware, and software, but systems and methods consistent with the present disclosure can be implemented as hardware alone. Additionally, the disclosed embodiments are not limited to the examples discussed herein.

Figure 4:
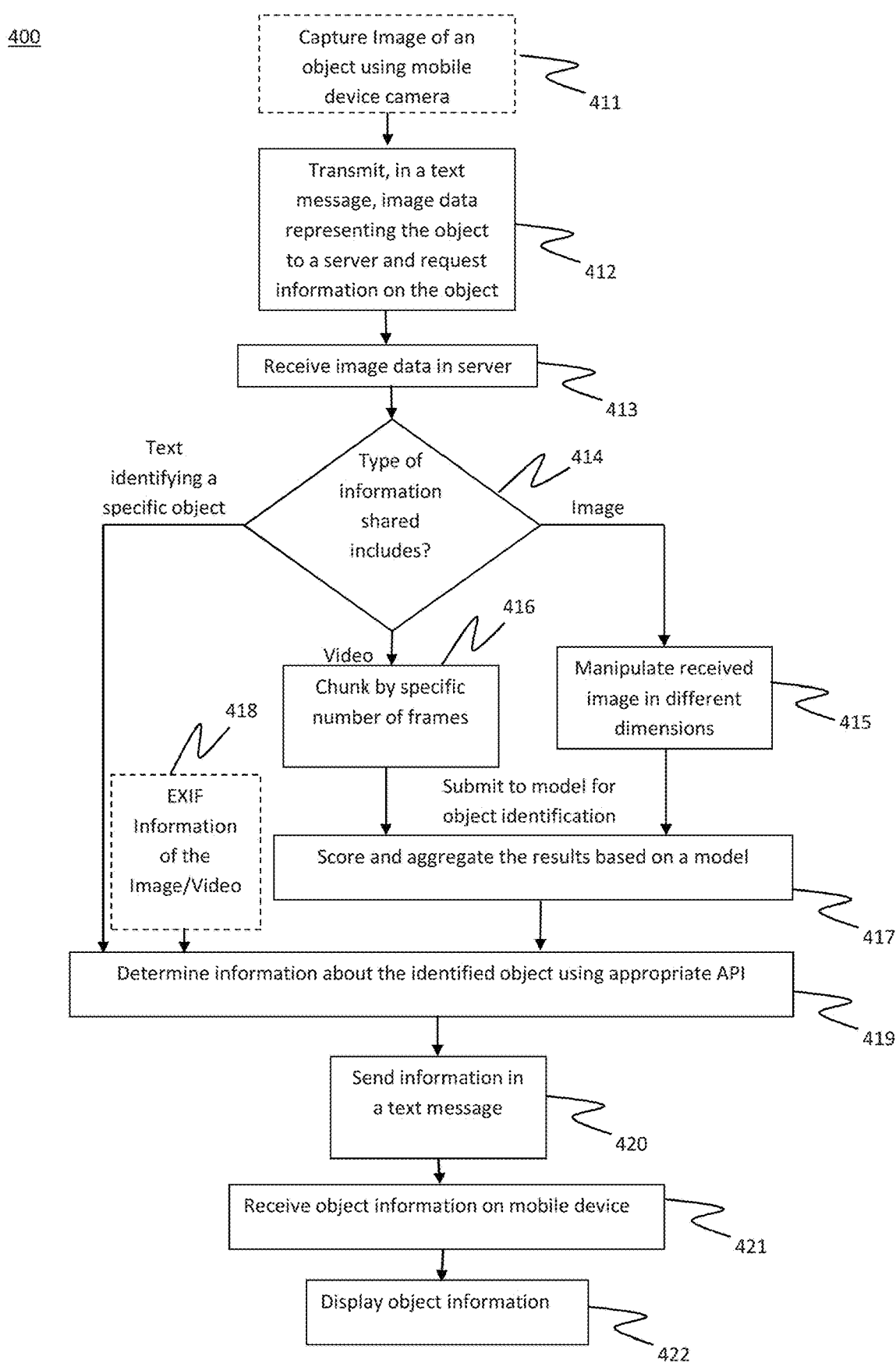
FIG. 4 is a flowchart of an exemplary method for providing information of objects, consistent with the present disclosure.

FIG. 4 is a flow chart illustrating an exemplary method for object information determination, consistent with the present disclosure. For discussion purposes, the exemplary methods discussed in this disclosure (including the method 400) are described as performed by user device 120 and server 111. In some examples, however user device 120 may perform one or more disclosed method steps. In some examples, different components of object identification system 100 (such as object identification service provider 110 and third-party service 140) may perform various steps of the methods in a distributed-computing configuration.

In step 411, camera 210 of user device 120 is utilized to capture an image or video of an object whose information needs to be determined. User device 120 may store data representing the image in memory 250.

In step 412, captured image data of the object in step 411 is transmitted to server 111 of object identification service provider 110. The transmission may be initiated in messaging application 231 which is part of operating system 230 of user device 120. User device 120 uses network interface 220 to transmit the image data through network 130 to server 111. In some examples, an image captured previously by camera 210 of user device 120 might be retrieved from memory 250 before transmitting it to server 111.

In step 413, server 111 may receive the image data representing the object to be identified. The server 111 receives the data at network interface 330. The received image data may include, for example, still image and/or video data captured by camera 210 of user device 120.

In step 414, server 111 of object identification service provider 110 determines if the received image data contains text, still image, or video data. If the received data is still image data, at step 415, the received image data is manipulated using image manipulation module 312 executed by processor 320 of server 111. This manipulation may include cropping the image, flipping the image along x-axis and y-axis, skew the image horizontally and vertically, change color characteristics of the image. The image manipulation results in multiple images of the received image data.

If the received data is video data, at step 416 the received data is "chunked," that is, divided into groups of frames, to extract multiple images using processor 320. The number of extracted images varies based on the length of the video among other characteristics of the video.

If the received data is text, a direct search of text is performed to identify the object with the text as its name.

In step 417, depending upon the type of data received, scoring module 313 processes the images obtained from image manipulation module 312 or the video chunked by frames. Scoring module 313 uses the multiple images obtained in step 415 and 416 to generate multiple identities of the object in the received image data. Scoring module 313 associates scores with the possible identities of the images obtained in steps 415 and 416 to generate matching identities. Aggregate module 314 then aggregates scores of the matching identities.

In step 418, any EXIF information available in the image data received by server 111 is extracted to identify the location where the image was captured.

At step 419, the identity with the highest score is regarded as the identity of the object n image. Once the identity of the object is determined server 111 may submit the identity information of an object to a third-party server 160 to obtain additional information. Additionally, EXIF information extracted in step 418 may be submitted to third-party server 160 to determine information about identified object.

At step 420, server 111 of object identification service provider 110 transmits, via network interface 330, object information including the determined identity of the object and related object information. The object information is transmitted via text messaging to user device 120 through network 130. In addition to the determined identity, the transmitted object information may include a physical address of a brick-and-mortar store or a URL of an online website where the identified object is available for sale.

At step 421, user device 120 receives the transmitted object information via messaging application 261 and network interface 240.

At step 422 the received object information is displayed on display screen 230 of user device 120.

Figure 5A:
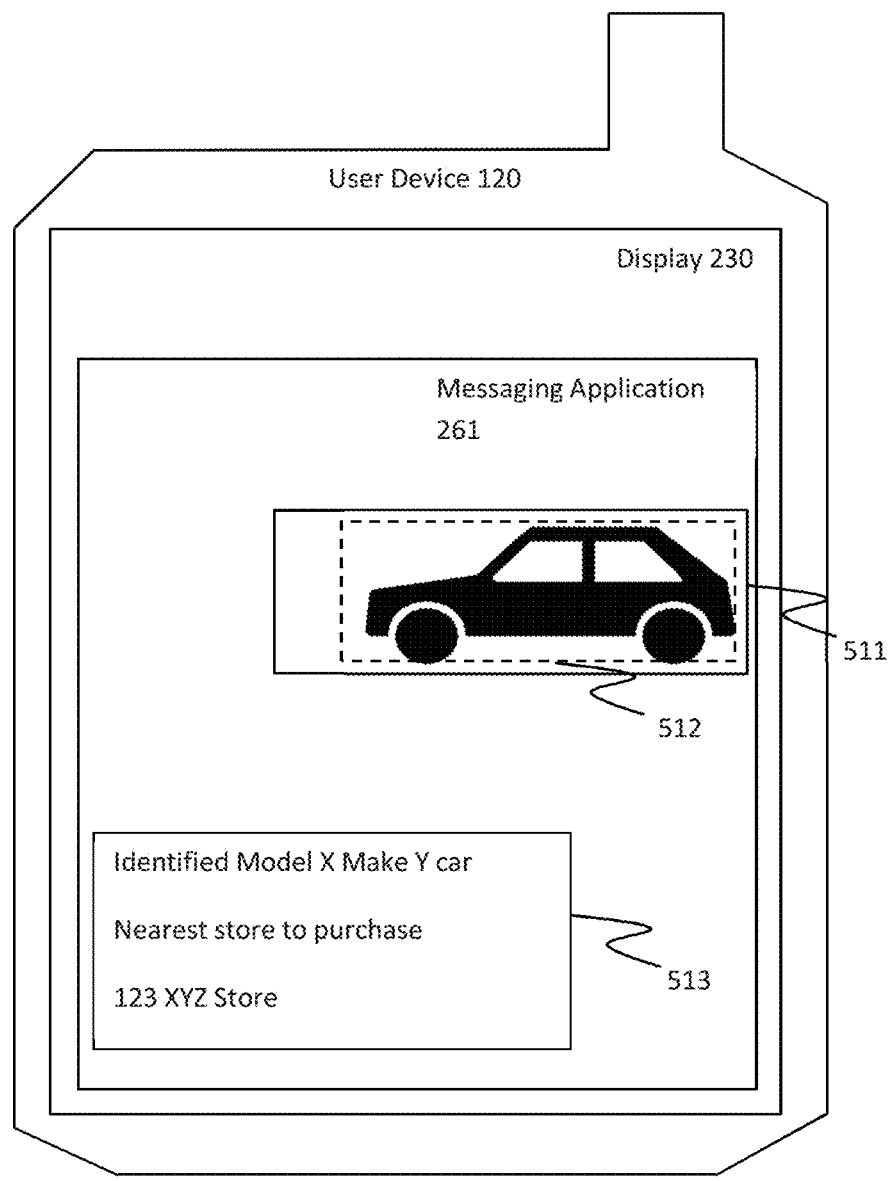
FIGS. 5A and 5B are diagrams showing exemplary post determination message of object information from a captured image, displayed on a user device of a user, consistent with the present disclosure.

FIG. 5A shows an exemplary user device 120 interacting with object identification service provider 110 to display information, received via messaging application 261, about an object represented by a previously captured image. As shown in FIG. 5A, a text conversation includes an outgoing message 511 containing image data 512 representing a car (object) is transmitted over network 130 by messaging application 261. Below that the messaging application 261 displays incoming message 513 with identity information and the physical address of a dealership where the identified object may be purchased.

Figure 5B:
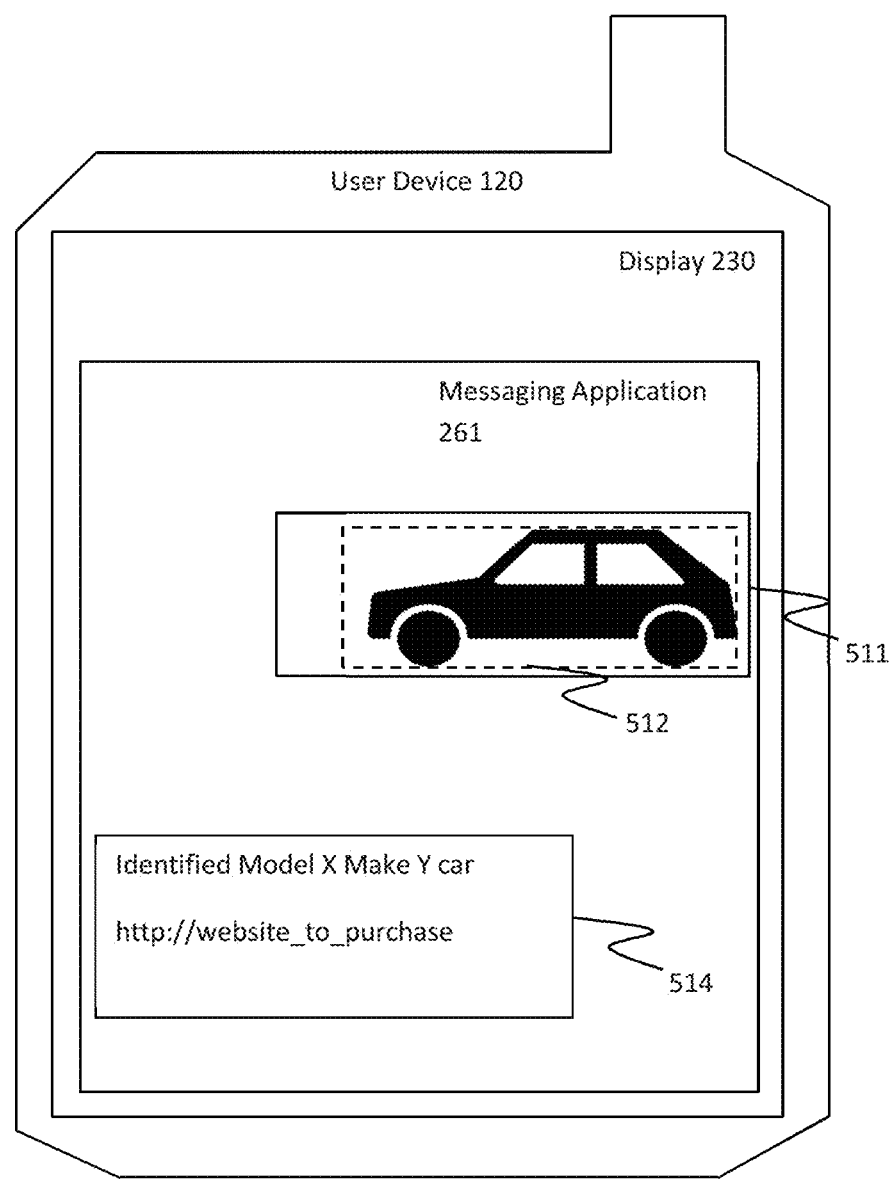

FIG. 5B shows another exemplary interaction similar to FIG. 5A. FIG. 5B differs from 5A in that the displayed object information includes URL to a website where the identified object is available for sale or where product reviews may be viewed.

Figure 5C:
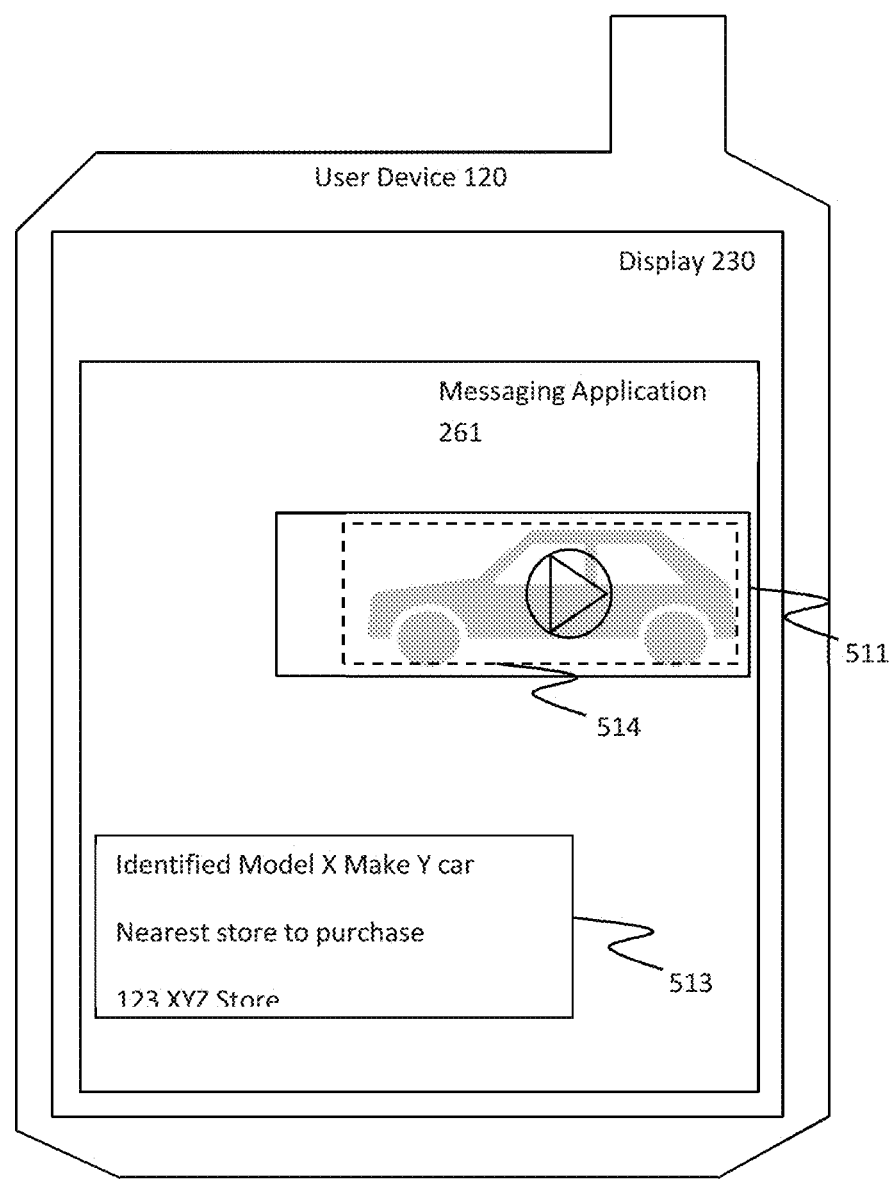
FIG. 5C is a diagram showing an exemplary post determination message of object information from a captured video, displayed on a user device of a user, consistent with the present disclosure.

FIG. 5C shows another exemplary interaction similar to FIG. 5A. As shown in FIG. 5C, messaging application 261 displays message 511 containing video image data 514.

Computer programs based on the written description and methods of this specification are within the skill of a software developer. The various programs or program modules can be created using a variety of programming techniques. For example, program sections or program modules can be designed by means of python, Java, C, C++, assembly language, or any such programming languages. One or more of such software sections or modules can be integrated into a computer system, non-transitory computer readable media, or existing communications software.

Moreover, while illustrative embodiments have been described herein, the scope includes any and all embodiments having equivalent elements, modifications, omissions, combinations (e.g., of aspect across various embodiments), adaptions or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A mobile device for determining object information, the device comprising:
   at least one memory device storing instructions, the instructions comprising an operating system with a text messaging application;
   a camera;
   a network interface;
   a display screen; and
   at least one processor executing the instructions to perform operations comprising:
      responding to a user input by capturing, with the camera, image data representing a captured image of an object,
      preparing a text message compatible with a text message service for communication,
      transmitting, via the text messaging application through the network interface to a server, the text message, the image data, and a request for information relating to the object, wherein the server is configured to prepare the information relating to the object in response to the request, by:
         generating temporary images of an entirety of the captured image by executing at least one modification on the captured image, wherein the modification is one of flipping the captured image along x-axis and y-axis, skewing the captured image horizontally and vertically, or changing color characteristics of the captured image by manipulating a histogram;
         comparing each of the temporary images to a plurality of external images of known objects from a database of reference images;
         assigning scores to the reference images based on similarity to each of the temporary images;
         aggregating the scores assigned to the reference images;
         extracting available exchangeable image file format (EXIF) information in the image data;
         identifying one of the reference images with a highest aggregated score as an identity of the object;
         determining information related to the object based on the identity of the object and the extracted EXIF information, wherein the determining includes sending at least one of the identity of the object and the extracted EXIF information to a third-party server; and
         preparing a response text message compatible with the text message service based on the determined object information, comprising at least one of:
            an identification of an entity offering the object for sale,
            an address of a website offering the object for sale,
            a physical location where the object is sold, or
            information about the object based on physical location of the extracted EXIF information;
      receiving the response text message via the text messaging application through the network interface from the server, and
      displaying the object information on the display screen via the text messaging application.

2. The device of claim 1, wherein the object information comprises an identification of the object.

3. The device of claim 2, wherein the object information of the object further comprises review information of the object.

4. The device of claim 1, wherein the camera comprises a video camera.

5. The device of claim 4, wherein:
   responding to the user input comprises capturing video data representing the object by the mobile device; and
   the operations further comprise extracting the image data of the object from the video data by the server.

6. The device of claim 5, wherein the server is further configured to extract multiple image frames from the video data based on a characteristic of the video data.

7. The device of claim 1, wherein the scores assigned to the reference images are computed based on at least one of a linear regression algorithm, a boosted tree algorithm, or a convolution neural network.

8. The device of claim 1, wherein the server is further configured to:
   capture text within the captured image; and
   perform a search of the text to identify the object in the captured image.

9. The device of claim 1, wherein:
   the object is a vehicle; and
   the plurality of external images of known objects are images of vehicles of known makes and models.

10. A non-transitory computer-readable storage medium storing instructions that, when executable by at least one processor of a mobile device, cause the mobile device to perform a method for determining vehicle information, the method comprising:
   responding to a user input by capturing, with a camera, image data representing a captured image of a vehicle;
   preparing a text message compatible with a text message service for communication;
   transmitting via a text messaging application through a network interface to a server, the text message and a request for information relating to the vehicle, the server being configured to prepare the information relating to the vehicle in response to the request, by:
      generating temporary images of an entirety of the captured image by executing at least one modification on the captured image,
      comparing each of the temporary images to a plurality of external reference images of known makes and models from a database of reference images,
      assigning scores to the known makes and models of the reference images based on similarity to the temporary images,
      aggregating the scores assigned to the reference images of the known makes and models, to create an aggregated make and model score,
      extracting available exchangeable image file format (EXIF) information in the image data,
      determining, based on the EXIF information, a physical location where the image data was captured,
      identifying one of the known makes and models with a highest aggregated make and model score as an identity of the vehicle,
      determining information related to the vehicle based on the identity of the vehicle and the physical location where the image data was captured, and preparing a response text message compatible with the text message service based on the determined vehicle information, the vehicle information comprising at least one of:
- an identification of an entity offering the vehicle for sale;
- an address of a website offering the vehicle for sale;
- a physical location where the vehicle is sold; or
- information about the vehicle based on the physical location where the image data was captured, receiving the response text mess age via the text mess aging application through the network interface from the server; and displaying the vehicle information on a display screen.

11. The non-transitory computer-readable medium of claim 10, wherein displaying the vehicle information comprises displaying an identification of the vehicle.

12. The non-transitory computer-readable medium of claim 11, wherein displaying the vehicle information further comprises displaying review information of the vehicle.

13. The non-transitory computer-readable medium of claim 10, wherein the scores assigned to the known makes and models are computed by applying at least one of: a linear regression algorithm, a boosted tree algorithm, or a convolution neural network.

14. The non-transitory computer-readable medium of claim 10, wherein the server is further configured to:
- capture text within the captured image; and
- perform a search of the text to identify the vehicle in the captured image.

15. The non-transitory computer-readable medium of claim 10, wherein:
- responding to the user input comprises capturing video data representing the vehicle by the mobile device; and
- the server is further configured to extract multiple image frames from the video data based on a characteristic of the video data.

16. A method performed by a mobile device, comprising:
- responding to a user input by capturing, with a camera, image data representing a captured image of a vehicle;
- preparing a text message compatible with a text message service for communication;
- transmitting via a text mess aging application through a network interface to a server, the text message and a request for information relating to the vehicle, the server being configured to prepare the information relating to the vehicle in response to the request, by:
  - generating temporary images of an entirety of the captured image by executing at least one modification on the captured image,
  - comparing each of the temporary images to a plurality of extern al reference images of known makes and models from a database of reference images,
  - assigning scores to the known makes and models of the reference images based on similarity to the temporary images,
  - aggregating the scores assigned to the reference images of the known makes and models, to create an aggregated make and models core,
  - extracting available exchangeable image file format (EXIF) information in the image data,
  - determining, based on the EXIF information, a physical location where the image data was captured,
  - identifying one of the known makes and models with a highest aggregated make and model score as an identity of the vehicle,
  - determining information related to the vehicle based on the identity of the vehicle and the physical location where the image data was captured, and
  - preparing a response text message compatible with the text message service based on the determined vehicle information, the vehicle information comprising at least one of:
    - an identification of an entity offering the vehicle for sale;
    - an address of a website offering the vehicle for sale;
    - a physical location where the vehicle is sold; or
    - information about the vehicle based on the physical location where the image data was captured;
- receiving the response text message via the text messaging application through the network interface from the server; and
- displaying the vehicle information on a display screen.

17. The method of claim 16, wherein displaying the vehicle information on the display screen comprises displaying an identification of the vehicle.

18. The method of claim 16, wherein the scores assigned to the known makes and models are computed based on at least one of a linear regression algorithm, a boosted tree algorithm, or a convolution neural network.

19. The method of claim 16, wherein the server is further configured to:
- capture text within the captured image; and
- perform a search of the text to identify the vehicle in the captured image.

20. The method of claim 16, wherein:
- responding to the user input comprises capturing video data representing the vehicle by the mobile device; and
- the server is further configured to extract multiple image frames from the video data based on a characteristic of the video data.

* * * * *